Patented Mar. 23, 1926.

1,578,044

UNITED STATES PATENT OFFICE.

HOWARD G. LAPSLEY, OF PLAINFIELD, NEW JERSEY, ASSIGNOR TO METALS REFINING CORPORATION, A CORPORATION OF NEW YORK.

METHOD OF PURIFYING MOLTEN METALS.

No Drawing. Application filed August 4, 1925. Serial No. 48,055.

*To all whom it may concern:*

Be it known that I, HOWARD G. LAPSLEY, a citizen of the United States, and resident of Plainfield, county of Union, State of New Jersey, have invented certain new and useful Improvements in Methods of Purifying Molten Metals, of which the following is a specification.

This invention relates to methods for the deoxidation, degasification and purification of metals while such metals are in the molten state, and relates particularly to methods of treating molten metals with aluminum boron compositions which act as reagents in such deoxidation, degasification and purification operations.

I have discovered that aluminum boron associations are particularly effective and efficient for the removal from molten metals and alloys of gaseous and other impurities, such, for example, as oxygen, hydrogen, nitrogen, sulphur, phosphorus, arsenic and carbon dioxide, which may be either combined with the metal, dissolved therein or otherwise carried thereby. By the term aluminum boron associations I mean compositions in which the component elements are entirely or for the main part chemically combined.

I have found that the aluminum boron associations of this invention possess distictive and advantageous properties which render them particularly valuable for molten metal treating agents, and that by reason of these properties such associations are more efficient and economical as deoxidation, degasification and purification reagents than either of the respective component elements alone, or than any of the heretofore proposed compounds of aluminum or boron with other elements. I have also found that the physical and other properties of many metals and alloys in various commercial forms are materially improved by the treatment of such metals and alloys, while in the molten state, by means of the methods of this invention.

I have further found that the aluminum boron associations of this invention readily react with oxygen, hydrogen, nitrogen, sulphur and other elements occuring as impurities in molten metals at temperatures equivalent to, or lower than the melting points of many metals and alloys, and further, that such reactions are usually exothermic and proceed rapidly and vigorously, but entirely without violence or violent volatilization of the component elements of the reagent. The reaction products of the reagents are generally borates of aluminum which have relatively low melting points, and form thinly fluid slags which quickly rise to the surface of the bath.

A further advantage of the use of the aluminum boron associations is that such compounds have a materially higher melting point than temperatures prevailing in molten metals and alloys, and these reagent associations are not soluble in metals and alloys under conditions prevailing in usual metallurgical practice, consequently, the operation of the methods of the present invention does not result in the introduction of residual impurities in the metals and alloys treated.

It is therefore an object of my invention to provide associations comprising aluminum and boron for the deoxidation, degasification and purification of molten metals and alloys.

The reagent associations employed in my present invention can be prepared by various metallurgical processes. In general, they can be readily produced from oxygen compounds of the component elements by electrothermal processes using carbon as a reducing agent, and when prepared by such means the component elements are obtained in a substantially metallic state more economically than by any other means.

It is to be understood that the aluminum boron associations of this invention may contain various other elements in the nature of impurities, such, for example, as carbon, iron, silicon, manganese, titanium, calcium and magnesium, which are incidental to manufacture. When the combined total of such incidental impurities is relatively small they do not have any material effect on the action of the reagents in the operation of the process of this invention.

I have found, however, that the presence of one or more additional elements such, for example, as carbon, iron, manganese, silicon, or titanium, in amounts greater than a few percent of the total weight of the reagent association, invariably decreases the effectiveness of the aluminum boron compounds, or is otherwise objectionable, e. g., the vigor and rate of reaction of the reagent associations with impurities contained in the metal bath is decreased; the reagents are rendered soluble in many metals and alloys, resulting in residual impurities in metals and alloys treated, and further, in many instances there is a material increase in the reaction temperatures of such compounds, with the result that such reagents will not react with impurities of the bath at normal temperatures prevailing in many metals and alloys.

As a specific example, for comparison in the treatment of molten copper and copper alloys, I cite a compound containing a relatively large percentage of carbon in the form of boron carbide, or as a multiple carbide of boron and aluminum. It is known that carbides of boron and carbides of aluminum are inert at temperatures prevailing in molten copper and copper alloys, and that it is necessary to superheat the copper or copper alloys approximately 200° centigrade, or more in order to bring about reaction between such carbides and oxides or other impurities in the metallic bath.

By means of research I have found that the aluminum boron associations of this invention will react to completely deoxidize and degasify copper and copper alloys at any temperature at which the copper or copper alloy is entirely molten. Furthermore, I have found that copper which has been treated by the methods of this invention is not only entirely free of oxides and substantially free of other impurities, such as sulphur, iron, arsenic, antimony, etc., but that such copper has a higher percentage of electrical conductivity and greater ductility, as well as other improved and advantageous physical properties, than copper heretofore produced by other means.

As a specific example for comparison in the treatment of iron and steel and alloys thereof I cite boron compounds or alloys containing relatively large percentages of iron or manganese, or both, such as ferro-boron, manganese-boron, or ferro-manganese-boron. It has been found that boron intimately associated with iron or manganese, or both does not readily react with oxygen, hydrogen, sulphur, nitrogen, or compounds thereof occurring in molten iron and steel and alloys thereof, and therefore, the efficiency of such boron compounds is so low that it is impossible to effect, by means of such materials, complete deoxidation and degasification of iron and steel and alloys thereof.

I have also found that the aluminum boron compounds of this invention possess marked advantages of efficiency and economy in comparison with either of the component elements alone. Aluminum will not react with oxides and other impurities at temperatures prevailing in molten copper and copper alloys, consequently, it is not of value for the treatment of such metal and alloys. Aluminum has been used in the treatment of molten steel, but it has been found that in such operations aluminum only reacts to partially deoxidize the steel, and that it does not remove any of the other gases or compounds occurring as impurities in molten steel. Furthermore, the use of aluminum for such partial deoxidation invariably results in the presence of alumina ($Al_2O_3$) as a residual impurity in the steel treated, and the injurious effect of such alumina inclusions in steel is recognized.

The manufacture of substantially pure boron by known methods is so difficult and expensive that this material has never been produced in commercial quantities, and therefore, has not been available for the treatment of metals.

In the reagents comprised in this invention the aluminum and boron are in forms which react with oxygen, sulphur, hydrogen, nitrogen and compounds thereof at relatively low temperatures, i. e., at temperatures lower than the melting points of many metals and alloys. Furthermore, the reaction products are thinly fluid slags at temperature normally prevailing in the molten metals and alloys treated, and such slags quickly separate from the treated metal and by reason of their low specific gravity, rise to the surface of the bath.

In the application of the methods of this invention the aluminum boron associations may be added to the metal treated at any time while it is in a furnace or crucible, or after it has been tapped or poured therefrom, such as into a ladle or mold, providing that the metal is molten. The reagents may be added cold, or preheated, and in any desired form, such as lump, shot or finely divided. In some instances it is of advantage to add the reagent in a suitable container which will burn or melt in the metal bath. As one example of the operation of the present invention in the treatment of molten steel; a predetermined quantity of aluminum boron reagent can be placed in a steel container, and this attached to a steel rod. The container is then introduced into the steel, preferably being plunged to a point near the bottom of the bath. When the container has melted and released the boron reagent the rod is removed, or it can be used to stir or agitate the metal to disseminate the reagent. However, stirring or agitation is not essential, particularly when the reagent is introduced relatively deep in the bath, for under such conditions it reacts to deoxidize and degasify the entire bath. The reaction takes place rapidly and within a short time the reaction products of the reagent rise to the surface of the bath, when they can be removed if desired. In the treatment of many metals and alloys, such for example as copper, copper alloys, nickel, nickel alloys, silver, silver alloys, aluminum and aluminum alloys, it is frequently of advantage to use a container or tool, for introducing the boron reagents, which will not melt or burn in the metal treated. It will be apparent that the means of introducing the reagents may be varied in accordance with the conditions of operation, the metal treated, etc.

I have found that iron, steel and alloys thereof, copper, copper alloys, and many other metals and alloys can be completely deoxidized and degasified and materially purified by the practice of the methods of this invention in which aluminum boron associations are used in amounts as low as one-half of one per cent and less of the weight of the metal or allow treated. By regulating the quantity of boron associations added molten metal may be completely or partially deoxidized, degasified or purified, as may be desired, and the extent of such treatment may be accomplished by means of one or more additions of the reagent. Furthermore, the reagents of this invention may be introduced into metals or alloys subsequent to, or in conjunction with additions of other reagents, and thus partial deoxidation may be accomplished by means of one or more other reagents and completion of the deoxidation and degasification effected by means of the aluminum boron reagents. For example, in the treatment of iron, steel, etc., such reagents as ferro-manganese or ferro-silicon may be added to the bath for the purpose of securing partial deoxidation and desulphurization, and the boron reagents can be added subsequently to effect complete deoxidation, degasification and purification. As a further example, molten copper can be partially deoxidized by means of one or more reagents, such as charcoal, coke, silicon or phosphorus, and subsequent to treatment with such materials boron reagents can be introduced into the copper to effect complete deoxidation, degasification and purification.

The process of this invention is of particular value in the manufacture of alloys such, for example, as copper alloys, steel alloys and nickel alloys. In such operations the aluminum boron reagents are used to deoxidize and degasify the bath before the alloying element or elements are added, and thus prevent any loss of the valuable alloying elements with the gases or other impurities which are ordinarily contained in molten metal.

I have cited herein certain metals and alloys in which I have found the aluminum boron associations of this invention to be particularly efficient for effecting deoxidation, degasification and purification, but it is to be understood that these citations do not limit the use of the aluminum boron reagents to the treatment of the metals and alloys cited as the methods of this invention can, in general, be advantageously utilized for the deoxidation, degasification and purification of any metal or alloy.

It is to be further understood that I am not limited as to the proportions of the components of the aluminum boron compounds, except that effective amounts of boron and aluminum are used, because I vary the amounts of boron and aluminum between 10% of boron and 90% of aluminum to 65% of boron and 35% of aluminum, according to the metal or alloy treated, the impurities to be removed, and other conditions under which operations are conducted.

While the use of the aluminum boron associations in effective amounts up to one-half of one percent of the weight of the metal or alloy treated will usually be sufficient to effect the desired extent of deoxidation, degasification and purification, I do not wish to be confined in the application of my invention to any specific amounts of the reagents, as the quantities used can be varied over a wide range in accordance with the metals treated, the conditions of operation and results desired without departing from the scope of my present invention.

As to the proportions of aluminum and boron in the association I give as a working example an aluminum boride in which aluminum is present in approximately 40% to 60% and boron in approximately 60% to 40% of the boride compound. It is to be understood however that the amounts can be greatly varied in accordance with the metal to be treated and the conditions under which treatment is made. Further, and as stated above, impurities and ineffective diluents may be present without affecting the purifying action of the association and without rendering it inefficient.

By the term treatment herein and in the claims following I intend the deoxidation, degasification, refining, and purification in general of molten metals and alloys, or any one, or combination of these results.

I claim:

1. The method of treating molten metal which comprises adding thereto a chemical compound of aluminum and boron.

2. The method of treating molten metal for the purification thereof which comprises adding thereto aluminum boride.

3. The method of treating molten metals for the purification thereof which comprises adding thereto an association of aluminum 50% to 60% and boron 50% to 40% in which these elements are for the main part chemically combined.

4. The method of treating molten metals for the purification thereof which comprises adding thereto an association of aluminum about 56% and boron about 44%, in which association the said ingredients are mainly associated as aluminum boride.

5. The method of treating molten metals for the purification thereof which comprises adding thereto an association of aluminum and boron, each of said ingredients being present in effective amounts and in which the elements are for the main part chemically combined.

6. The method of treating molten metals which comprises adding thereto a material which comprises mainly a chemical compound of aluminum and boron.

7. The method of treating molten metal which comprises adding thereto an association of aluminum and boron containing from 10% to 60% boron and from 90% to 40% aluminum, in which association the said elements are mainly associated as aluminum boride.

Signed at New York, in the county of New York and State of New York, this 3rd day of August, A. D. 1925.

HOWARD G. LAPSLEY.